United States Patent [19]
Kin et al.

[11] Patent Number: 5,532,678
[45] Date of Patent: Jul. 2, 1996

[54] HYDROPLANING DETECTOR APPARATUS

[75] Inventors: Keiyu Kin; Yoshimitsu Akuta; Yuji Sakaki, all of Saitama, Japan

[73] Assignee: Honda Giken Kogyo Kabushiki Kaisha, Tokyo, Japan

[21] Appl. No.: 395,694

[22] Filed: Feb. 28, 1995

[30] Foreign Application Priority Data

Mar. 22, 1994 [JP] Japan ..................................... 6-050864

[51] Int. Cl.⁶ .................................................. B60Q 1/00
[52] U.S. Cl. .......................... 340/438; 340/439; 340/444; 340/441; 180/197; 180/271; 364/426.01; 364/426.02
[58] Field of Search .................................... 340/438, 439, 340/444, 441, 670; 364/426.02, 426.01, 426.03; 180/197, 271; 73/9, 507; 324/161

[56] References Cited

U.S. PATENT DOCUMENTS

| | | | |
|---|---|---|---|
| 5,032,821 | 7/1991 | Domanico et al. | 340/438 |
| 5,220,307 | 6/1993 | May et al. | 340/439 |
| 5,350,035 | 9/1994 | Bodier et al. | 180/271 |
| 5,424,714 | 6/1995 | Kin et al. | 340/438 |
| 5,481,455 | 1/1996 | Iwata et al. | 364/424.01 |

FOREIGN PATENT DOCUMENTS

| | | |
|---|---|---|
| 63-265172 | 11/1988 | Japan . |
| 5-107257 | 4/1993 | Japan . |
| 6-11515 | 1/1994 | Japan . |

Primary Examiner—Brent A. Swarthout
Assistant Examiner—Ashok Mannava
Attorney, Agent, or Firm—Nikaido, Marmelstein, Murray & Oram

[57] ABSTRACT

A hydroplaning detection system comprising AM specific frequency component extraction AM, which comprises a band-pass filter for extracting signal components PS in a main frequency band corresponding to the wheel rotation speed or the vehicle speed from wheel rotation speed signals, and a band-pass filters for respectively extracting signal components PL in other frequency bands, and AM determining the occurrence of hydroplaning based on the ratio PL/PS between the signal components PS in the main frequency band and the signal components PL in other frequency bands.

4 Claims, 7 Drawing Sheets

$$D = x \cdot A + y \cdot B + z \cdot C$$

$A = \sum_{i=1}^{n} | SKfi - SJfi |$ : Similarity between patterns $B = | SK - SJ |$ : Difference in level of main frequency components $C = | fSK - fSJ |$ : Deviation in main frequencies

$x, y, z$ : Parameters

FIG. 7(a)

VARIATION IN PENETRATION OF WATER FILM
VARIATION OF RESIDUAL GROUND PLANE
⇒ VARIATION OF RESISTANCE FROM WATER FILM ⇒ OCCURRENCE OF VARIATION IN TIRE ROTATION SPEED

FIG. 7(b)

ALMOST TOTAL ABSENSE OF LOW FREQUENCY COMPONENTS

MAIN FREQUENCY

FIG. 7(c)

LOW FREQUENCY COMPONENTS GENERATED BY WATER FILM RESISTANCE

MAIN FREQUENCY

HYDROPLANING DETECTOR APPARATUS

BACKGROUND OF THE INVENTION

1. Field of the Invention

The present invention relates to an apparatus for detecting hydroplaning by monitoring the rotation speed of wheels (tires), and, more particularly, to a hydroplaning detector apparatus which properly detects and immediately reports partial hydroplaning (the initial stage of the occurrence of hydroplaning) where a wheel (tire) repeatedly floats above and then contacts the road as water (liquid) penetrates the wedge shape between the road and the wheel (tire), whereby such report enables stable operation of the vehicle.

2. Description of the Related Arts

Hydroplaning means a phenomenon in which, when a vehicle travels over a water film such as a puddle at a high speed (generally 80 km or more, depending on the type of tire), the wheel temporarily floats above the road, and the coefficient of friction suddenly decreases between the road and the wheel. Hydroplaning occurs when a water film penetrates in the wedge shape between the road and the wheel, and its dynamic pressure pushes the wheel upward. Various apparatuses have been proposed which detect the occurrence of hydroplaning and notify the driver of its occurrence to ensure safety driving.

To detect the occurrence of hydroplaning, there is known a technique for utilizing output signals from acceleration sensors which are mounted on the suspension for detecting vertical acceleration (for example, determination through a comparison of the magnitude of output values from the acceleration sensors, and determination based on the level of high-frequency components). There is furthermore known a technique for monitoring output signals from wheel speed sensors.

The technique utilizing the output signals from the wheel speed sensors includes (1) a pattern matching technique comparing typical patterns for changes in the wheel rotation speed when hydroplaning occurs, and determining the occurrence of hydroplaning (Published Unexamined Patent Application No. 5-107257); (2) a speed change differential technique determining the occurrence of hydroplaning based on the gradient of wheel rotation speed change (Published Unexamined Patent Application No. 63-265172); and (3) a technique for determination based on variations in the speed signals from respective wheels (four in total).

The inventor proposed an apparatus in Published Unexamined Patent Application No. 6-11515 which is an apparatus utilizing the pattern-matching technique (1), and which can more properly detect hydroplaning by appropriately modifying a reference change pattern depending on the conditions of vehicle operation, and by appropriately modifying the threshold for determination depending on the conditions of vehicle operation.

However, the various conventional detection techniques were difficult to use in detecting the initial stage of the occurrence of hydroplaning or the partial occurrence of it.

For example, the apparatus utilizing the pattern-matching technique for the results of frequency component analysis proposed in Published Unexamined Patent Application No. 6-11515 can detect the initial stage of occurrence of hydroplaning (partial occurrence of hydroplaning) by modifying the reference pattern depending on the conditions of vehicle operation, but may not always have sufficient detection accuracy.

Figure 6A:
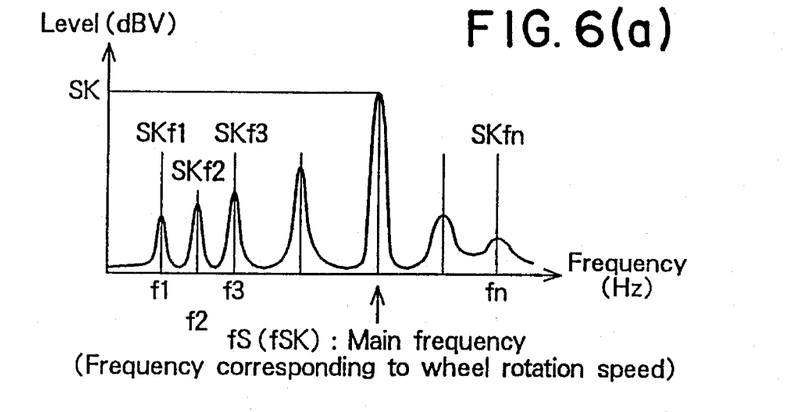
FIG. 6(a)–(c) are illustrations for a specific example of hydroplaning detection by the analysis of frequency components of wheel rotation speed signals.
Figure 6B:
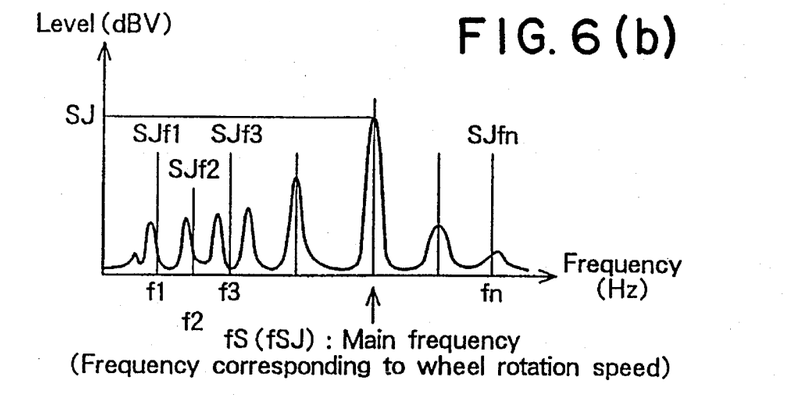
Figure 6C:
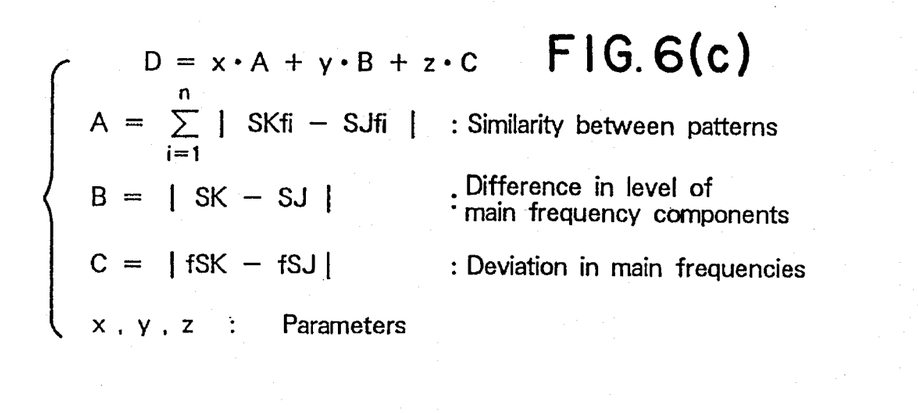

In addition, the technique using the frequency component analysis can detect the initial stage of the occurrence of hydroplaning (partial occurrence of hydroplaning) by comparing the reference data shown in FIG. 6(a) with the actual data shown in FIG. 6(b) and determining the difference D from the reference data shown FIG. 6(c), but has the following problems:

The first problem is requiring the reference data (reference pattern) shown in FIG. 6(a). Reference data is usually established based on measurement data on a dry road. However, the frequency components in the wheel rotation speed signals vary depending on each of such factors as the type of vehicle, the type of tire to be used, tread patterns, road surface conditions (type of road surface, and degree of unevenness), vehicle speed, load weight, and operating conditions such as direct advance, turning, flat road, uphill, or downhill. Therefore, it is very difficult to select which conditions are to be used as the reference. The detection accuracy is directly affected by the difference between the operating conditions when establishing the reference and the actual run state.

Even if the type of vehicle, the type of tire, and the tread pattern are specified on the assumption of straight operation on a flat road, and reference data is prepared for each factor, the detection accuracy may be degraded because it is substantially not possible to meet changes of the frequency components in the wheel speed data due to variations in pneumatic pressure in the tire or wear in the tread pattern.

If it is intended to maintain predetermined accuracy, the reference data is forced to be changed every time when, for example, the tire is changed. This causes difficulty in maintenance and operation.

As shown in FIG. 6(c), also taken account in calculating the difference D is the level difference in the frequency band for the main frequency components fS centering on a frequency fS proportional to the wheel rotation speed (the absolute value of the difference between the reference level SK of the main frequency components shown in FIG. 6(a) and the level SJ of the main frequency components in the actual run state shown in FIG. 6(b)). However, since the level SJ of the main frequency components fS varies depending on the difference between the type of road surface in establishing the reference data and that in the actual operation, or difference of unevenness of the road surface, it may be unreasonable to directly compared the level SJ with the level SK of the reference data.

Furthermore, the deviation in the center frequency of the main frequency components (the absolute value of the difference between fSK and fSJ) is also utilized in calculating the difference D. However, it is for detecting the fact that hydroplaning occurs in full, and the rotation speed of the wheel becomes no longer proportional to the vehicle speed. Because the vehicle speed maintains the proportional relationship with the frequency fS in the main frequency components for the wheel rotation speed in its initial stage where water starts to penetrate between the wheel and the road in the wedge shape, there arises no frequency deviation $\Delta fS$ for the main frequency components fS in the initial stage of hydroplaning.

Figure 7A:
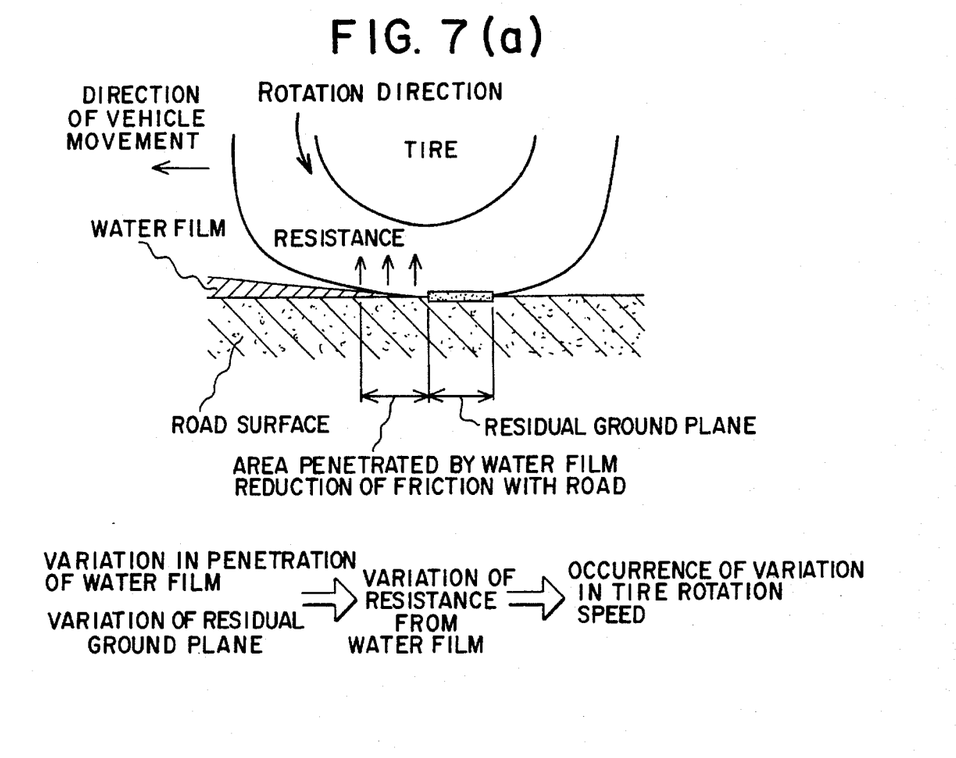
FIG. 7(a)–(c) are view illustrating the effects of the penetration of a water film.

In its initial stage, as shown in FIG. 7(a), as the degree of penetration of water film between the wheel and the road surface, the area of the residual ground plane of the tire varies, and the resistance from the water film varies so that, in the case of a following wheel, there arises the variation in rotation speed to reduce the rotation speed of the wheel (in the case of a driving wheel, the rotation speed may increase).

Figure 7B:
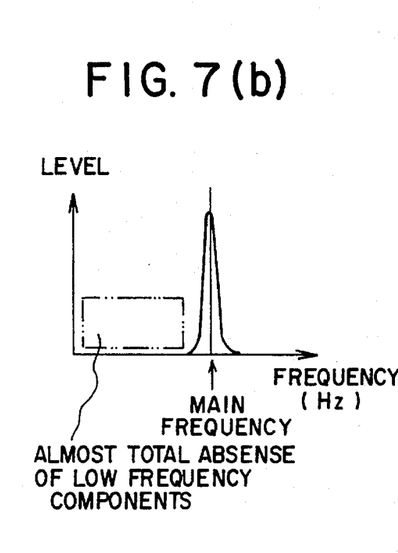
Figure 7C:
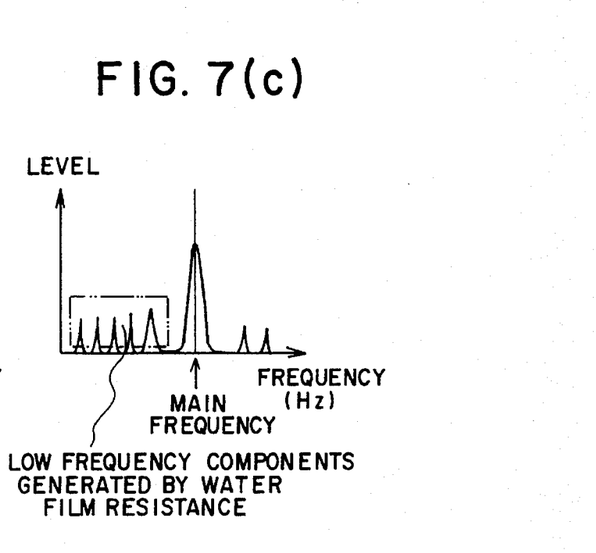

Thus, as shown in FIGS. 7 (b) and (c), the rotation speed signals may include other new frequency components (particularly, components for frequencies lower than the main frequency), or the level of other frequency components may increase.

Because the above problems are involved, even if the difference D is calculated for the predetermined reference data based on the calculation expression shown in FIG. 6 (c), it was difficult to accurately detect the occurrence of partial hydroplaning.

Furthermore, the conventional determination method prepares different reference data for each of the types of vehicle, the types of tire, and differences in tread patterns making it difficult to use such a method universally for every type of vehicle.

SUMMARY OF THE INVENTION

The present invention is intended to eliminate such problems, and to provide a hydroplaning detector apparatus which does not use the reference data, that is, is independent from the types of vehicle or tire, can accommodate a wide range of operating conditions, and can accurately detect even the initial stage of the occurrence of hydroplaning.

The hydroplaning detector apparatus according to claim 1 is arranged to extract main frequency components corresponding to wheel rotation speed or vehicle speed, and other signal components in frequency bands near the main frequency from wheel rotation speed signals output from a wheel rotation speed sensor by a specific frequency component extraction means, and to determine the occurrence of hydroplaning based on the respective extracted signal components so that the occurrence of hydroplaning can be detected only from the frequency components in the wheel rotation speed signals. Thus, the occurrence of such a phenomenon including the initial stage of its occurrence can be accurately detected regardless of the type of vehicle or tire, or various operating conditions. Furthermore, because it is not necessary to store reference data, and to have a means for calculating the difference between reference data and the wheel rotation speed sensor in actual operation as in the conventional detector, the arrangement of the apparatus can be simplified.

Frequency components necessary for determining the occurrence of hydroplaning can be effectively extracted by an arrangement in which specific frequency components are separately extracted by a main component extraction means and a plurality of other component extraction means for different bands of frequencies lower than the frequencies for main components, and an adder means adds the outputs of the plurality of other component extraction means. Particularly, when frequency bands lower than the main frequency are divided into several bands, which are handled by a plurality of other component extraction means, frequency components necessary for the determination can be properly extracted even if the frequency bands are not continuous. In other words, when it is compared with the arrangement where a wide range of bands including frequency components unnecessary for determination and evaluation is extracted by one other component extraction means, it reduces the inclusion of components such as noise so that more proper determination becomes possible.

Under the situation where hydroplaning may occur, hydroplaning significantly affects the frequency band lower than the main frequency, and also affects the frequency band higher than the main frequency even at low levels. Therefore, with an arrangement in which the frequency band is divided into a plurality of bands, and outputs extracted from them are added, it becomes possible to perform detection and determination using signal components in frequencies higher than the main component as well.

In addition, with an arrangement which comprises a ratio calculation means for calculating the ratio between the level of signal components in the main frequency band and the level of signal components in the other frequency bands, and a comparator means for comparing the level ratio with a threshold, and determining the occurrence of hydroplaning, it becomes possible to perform stable determination regardless of the variation in characteristics such as the sensitivity of the wheel rotation speed sensor or the variation in the absolute level of the wheel rotation signals due to aging, or the variation in the output level of the wheel rotation speed sensor under the influence of road surface condition or tire characteristics. Because the determination is made based on the ratio, it is not necessary to change the threshold level in response to the output level of the wheel rotation speed sensor so that the setting of threshold level can be also simplified.

The hydroplaning detector apparatus according to claim 4 comprises a main component extraction means for extracting main frequency components corresponding to the speed of vehicle, and a low frequency component extraction means for extracting signal components in frequency bands lower than the main frequency so that other components can be easily extracted with a simple arrangement and the entire arrangement of the apparatus can be further simplified.

In addition, the determination is performed based on the level ratio between the main components and other components in lower frequencies so that, as described earlier, the partial hydroplaning (initial stage) can be effectively detected.

DETAILED DESCRIPTION

Preferable embodiments of the present invention will be explained with reference to the attached drawings in the sections which follow.

Figure 1:
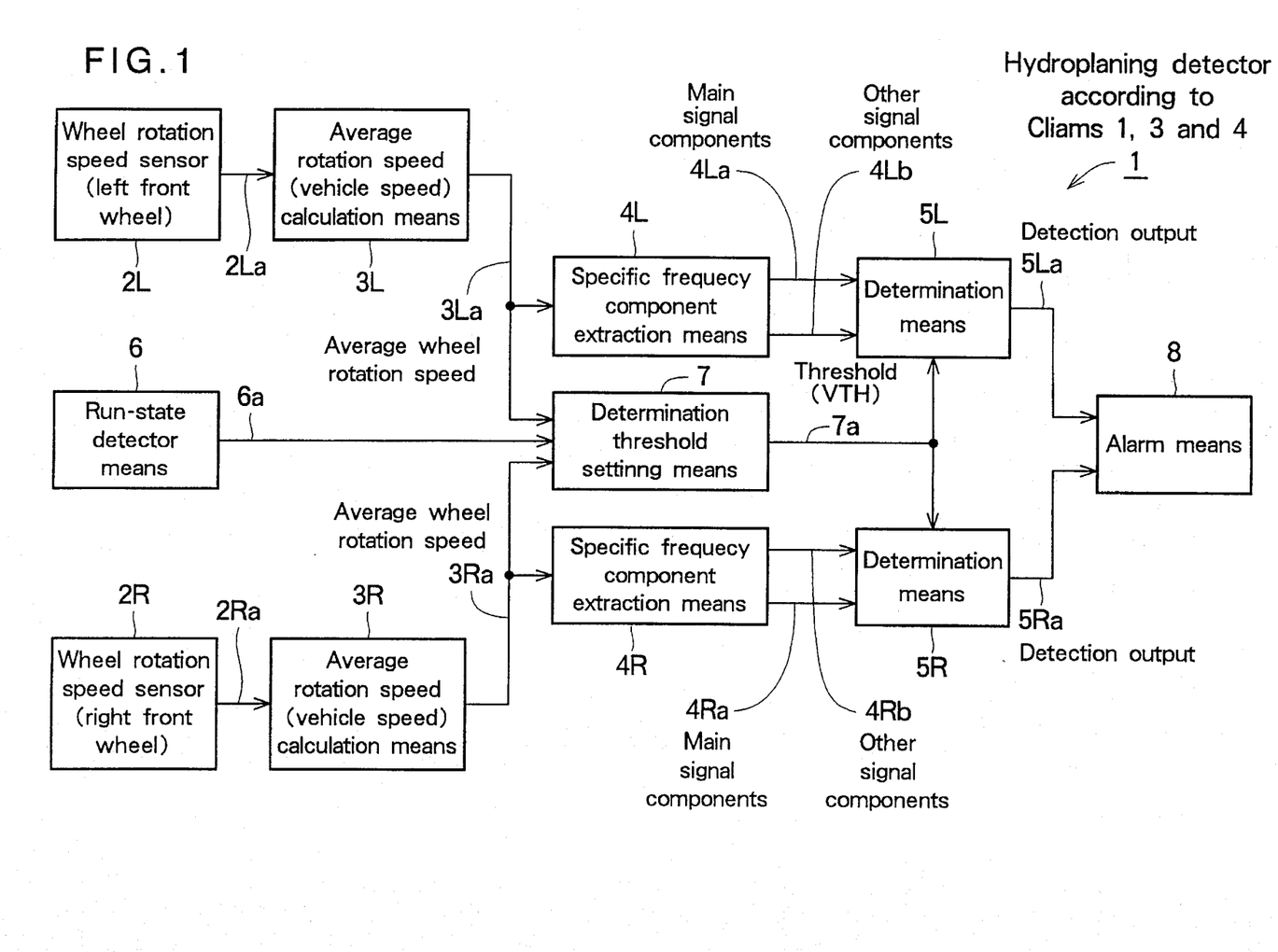
FIG. 1 is a block diagram showing the entire arrangement of the hydroplaning detector apparatus according to claims 1, 3, and 4.

FIG. 1 is a block diagram showing the entire arrangement of the hydroplaning detector apparatus according to claims 1, 3, and 4.

The hydroplaning detector apparatus 1 shown in FIG. 1 assumes a rear wheel drive vehicle, and detects the hydroplaning based on respective wheel rotation signals 2La and 2Ra output from wheel rotation speed sensors 2L and 2R installed on the left and right front wheels (not shown), respectively. The apparatus 1 comprises the average rotation speed (average vehicle speed) calculation means 3L and 3R, the specific frequency component extraction means 4L and 4R, the determination means 5L and 5R, a run-state detector means 6, a determination threshold setting means 7, and an alarm means 8 which visually or audibly notifies the driver of the occurrence or initial stage of hydroplaning based on detection outputs 5La and 5Ra from the respective determination means 5L and 5R.

The average rotation speed (average vehicle speed) calculation means 3L (3R) calculates an average of the rotation speed of each wheel for a short period of time (short period average vehicle speed) 3La (3Ra) based on the wheel rotation speed signals 2La (2Ra), and supplies them to the specific frequency component extraction means 4L (4R).

In the case where the wheel rotation speed sensors 2L (2R) are of a structure having pickup coils for detecting magnetic flux from magnets fixed on a wheel or axle, and output a signal of one cycle of a sinusoidal wave for one rotation of a wheel or in every predetermined rotation angle, the average rotation speed (average vehicle speed) calculation means 3L (3R) obtains a pulse signal by wave shaping such as slicing of the amplitude at, for example, the positive side of the sinusoidal wave at a predetermined level, sequentially measures the cycle T of the pulse signal, determine, for example, an average of 10 cycles, and outputs a signal 3La (3Ra) for the average rotation speed of wheel (short period average wheel rotation speed signals, which are hereinafter called "average wheel rotation speed" for short). It may be arranged to eliminate the effects of the momentary change in the rotation speed caused by passing over steps or intrusion of electrical noise by eliminating the maximum and minimum values of a series of cycle data Tn, and determining the average of remaining data.

The reason why the average for a relatively short period of time is used is to improve the accuracy for detecting the occurrence of hydroplaning. To this end, averaging is performed for such a period of time so as not to cause a case where temporary change in the wheel rotation speed caused by unevenness in the road, passing over steps or intrusions of electrical noise is directly supplied to the specific frequency component extraction means 4L (4R) to vary the frequency band to be extracted. Averaging for a relatively long period of time (one to several seconds) is not desirable because frequency components corresponding to actual wheel rotation speed (vehicle speed) cannot be extracted in acceleration or deceleration, leading to a degradation in detection accuracy.

The specific frequency component extraction means 4L (4R) extracts signal components in the main frequency band corresponding to the average wheel rotation speed (main components) 4La (4Ra) and signal components in other frequency bands near the main frequency (other components) 4Lb (4Rb) from the average wheel rotation speed 3La (3Ra), and supplies them to the determination means 5L (5R).

Figure 2:
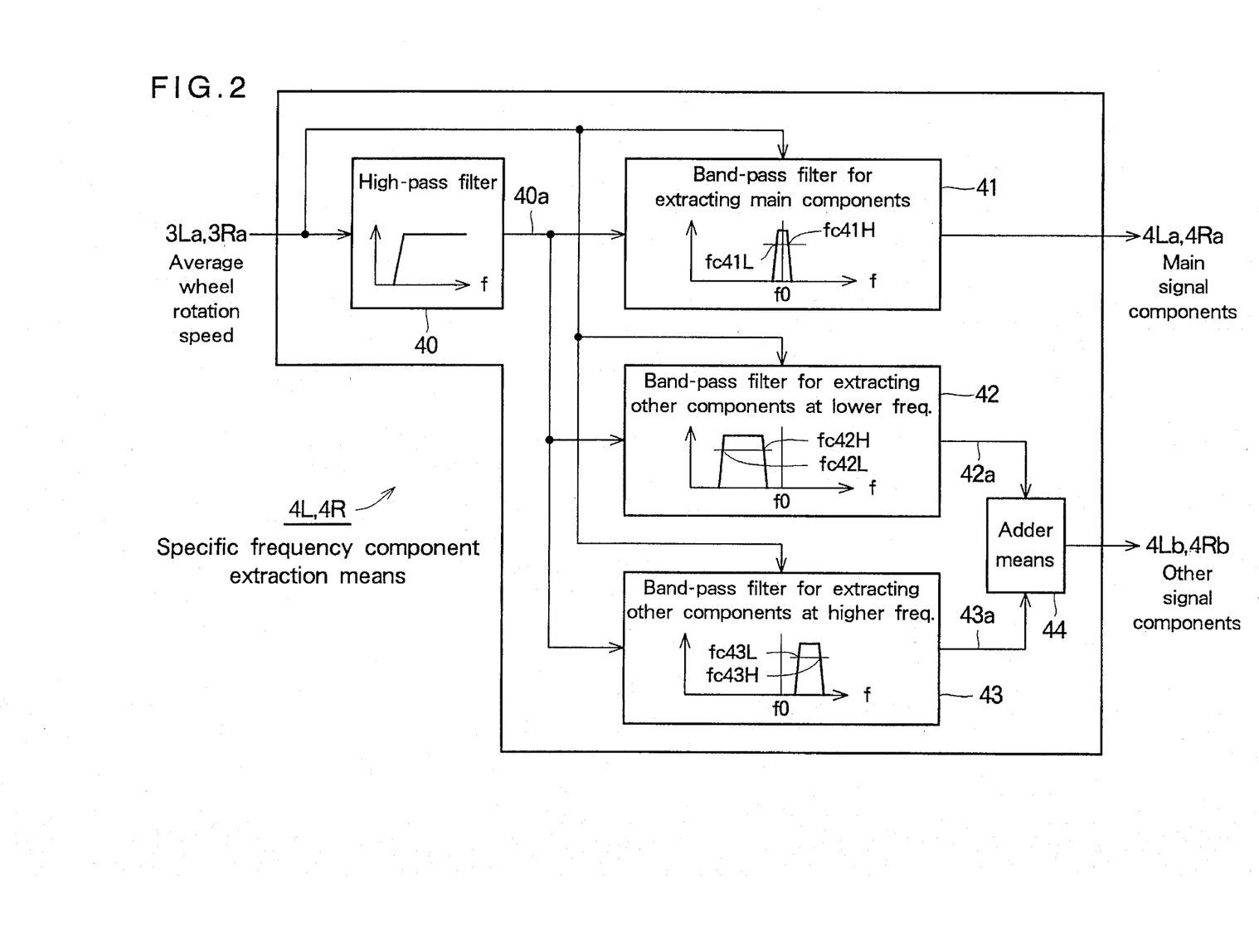
FIG. 2 is a block diagram showing an embodiment of the specific frequency component extraction means.

FIG. 2 is a block diagram showing an embodiment of the specific frequency component extraction means 4L (4R).

The specific frequency component extraction means 4L (4R) comprises a high-pass filter (HPF) 40 the cutoff frequency of which is set to a very low frequency such as 3 Hz to eliminate variations in the average wheel rotation speed 3La (3Ra) due to acceleration or deceleration of the vehicle and the like caused by operation of the accelerator by the driver, a plurality of band-pass filters (BPF) 41–43 the input of which is the output 40a of the high-pass filter, and an adder means 44.

Each of the band-pass filters 41–43 is constructed by using a variable pass band active filter and the like which can vary the pass band based on the average wheel rotation speed 3La or 3Ra averaged for a short period of time. The band-pass filters are a band-pass filter 41 for extracting the main components, a band-pass filter 42 for extracting other components at lower frequencies than the main components, and a band-pass filter 43 for extracting other components at higher frequencies than the main components.

For the band-pass filter 41 for extracting main components, the main frequency of pass band (center frequency) f0 is set based on the average wheel rotation speed 3La (3Ra), and the higher and lower cut off frequencies fc41H and fc41L are set to provide predetermined pass bands with respect to the center frequency f0. It is arranged to ensure the pass band width in a predetermined ratio to the main frequency (center frequency) f0 as, for example, fc41H=f0×1.1 and fc41L=f0×0.9. It may be an arrangement where the pass band width is ensured with positive and negative margins with respect to the main frequency (center frequency) f0. The cut off characteristics are established to be relatively steep such as 12 to 18 dB per octave so as to only extract the basic frequency component of the wheel rotation speed. In addition, a margin is provided for the band width by taking into account the time constant in the calculation of the average rotation speed and time delay due to the calculation, which margin enables it to extract the frequency components even if the average wheel rotation speed 3La and 3Ra for a short period of time, the result of calculation, contains some speed variation.

The average wheel rotation (average vehicle speed) calculation means 3L (3R) may be constructed to output numerical data which indicates how many rotations the wheel makes in a unit of time as its calculated output value (average wheel rotation speed for a short period of time) 3La (3Ra). The band-pass filter 41 for extracting main components may have a pass band in which the numerical data of the filter becomes the center frequency of the pass band.

For the band-pass filter 42 for extracting other components at lower frequencies, the upper and lower limit frequencies fc42H and fc42L of the pass band are set based on the average wheel rotation speed 3La (3Ra). It is arranged that the signal components in a band adjacent to the lower frequency of the main components f0 can be extracted by setting, for example, fc42H=f0×0.85 and fc42L=f0×0.2.

The band-pass filter 42 for extracting other components at lower frequencies may have a simplified hardware configuration in which only the upper limit frequency fc42H of the pass band is variable, while the lower limit frequency fc42L is fixed.

For the pass filter 43 for extracting other components at higher frequencies, the upper and lower limit frequencies fc43H and fc43L of the pass band are set based on the average wheel rotation speed 3La (3Ra). It is arranged that the signal components in a band adjacent to the higher frequency of the main components f0 can be extracted by setting, for example, fc43H=f0×1.5 and fc43L=f0×1.15. The reason why the higher frequency band is set to a relatively narrow band lies in the fact that the signal components for information necessary for detecting hydroplaning are fewer in this band, and the signal components are not significantly separated from the main frequency f0.

The band-pass filter 43 for extracting other components at higher frequencies may also have such a configuration similar to that at lower frequencies in which only the lower limit frequency fc43L=f0×1.15 is variable.

The adder means adds the outputs 42a and 43a from the upper and lower band-pass filters 42 and 43, and outputs the other signal component 4Lb (4Rb).

Figure 3:
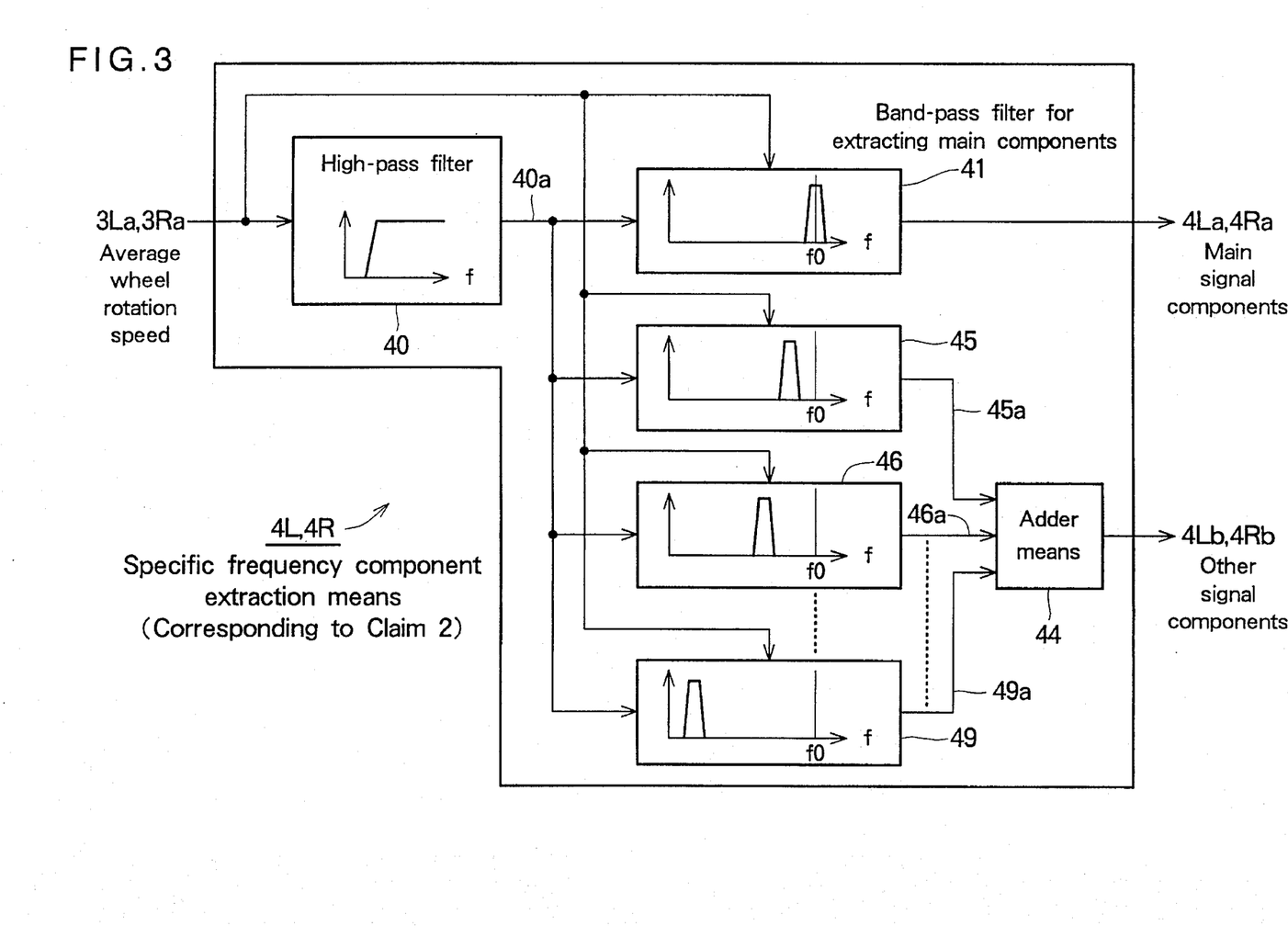
FIG. 3 is a block diagram showing another embodiment of the specific frequency component extraction means.

FIG. 3 is a block diagram showing another embodiment of the specific frequency component extraction means.

The specific frequency component extraction means 4L (4R) corresponds to the invention recited in claim 2 in which other components at lower frequencies are extracted by a plurality of band-pass filters (for example, five) 45–49, and an adder means 44 adds and outputs the outputs 45a–49a of each band-pass filter. The plurality of band-pass filters 45–49 enables it to extract only signal components in frequency bands contributing to the detection of hydroplaning so that the signal-to-noise ratio (S/N ratio) of the other signal components can be improved to attain further accurate detection.

Figure 4:
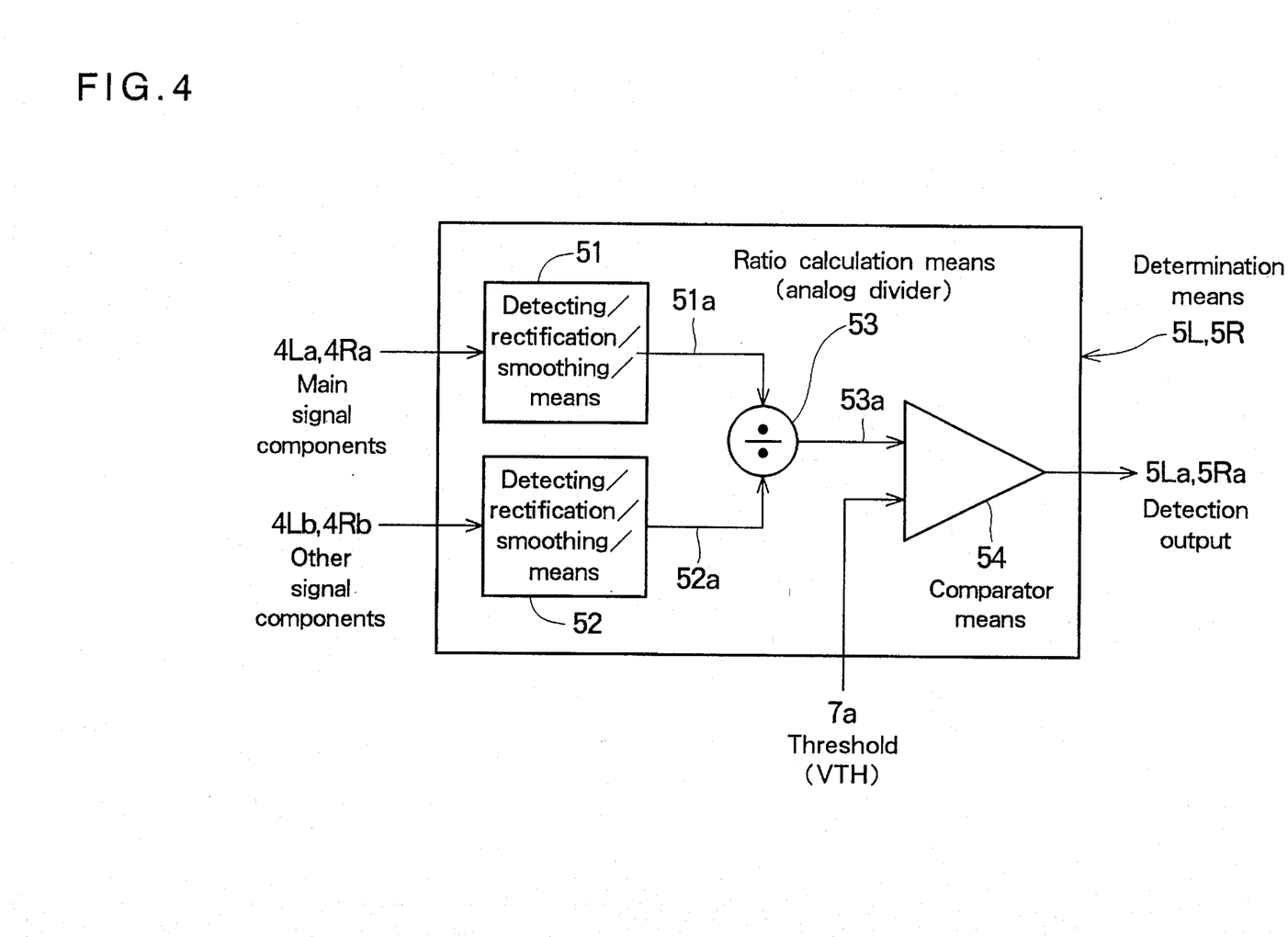
FIG. 4 is a block diagram showing the arrangement of an embodiment of the determination means.

FIG. 4 is a block diagram showing the arrangement of an embodiment of the determination means.

The determination means 5L (5R) comprises detection/rectification/smoothing circuits 51 and 52 which respectively detect and rectify the main signal components 4La (4Ra) and the other signal components 4Lb (4Rb) output from the specific frequency component extraction means 4L (4R), convert them to pulsating signals, and smooth the pulsating signals with a predetermined time constant (for example, several hundred milliseconds to several seconds) to obtain direct current signals, a ratio calculation means 53 consisting of an analog divider and the like receiving a direct current voltage output 51a for the main signal components and a direct current voltage output 52a as inputs and outputting a direct current voltage 53a which corresponds to the level ratio between the main components and the other components, and a comparator means 54 consisting of a voltage comparator and the like comparing the direct current voltage 53a on the level ratio with a direct current voltage (VTH) 7a on a threshold and outputting a detection output 5La (5Ra) for hydroplaning when the direct current voltage 53a on the level ratio exceeds the threshold.

It may be arranged to analog-to-digital-convert the respective direct current voltage 51a and 52a with an A/D converter (not shown), to obtain a level ratio by dividing the respective A/D converted result data, and to compare the level ratio with a predetermined threshold data for the determination of hydroplaning occurrence. It may be also arranged to analog-to-digital-convert the respective signal components 4La, 4Ra, 4Lb, and 4Rb, and to calculate the level of each signal component with digital calculation.

The run-state detector means 6 shown in FIG. 1 is arranged to generate and output a signal 6a representing the running state of the vehicle by utilizing such factors as the vehicle speed, the steering wheel angle, the yaw rate of the vehicle, and the transversal acceleration acting on the vehicle.

The determination threshold setting means 7 supplies a direct current voltage (VTH) 7a on a predetermined threshold level.

The determination threshold setting means 7 also monitors the vehicle speed based on the average wheel rotation speed 3La and 3Ra which are the calculation outputs of the average rotation speed (vehicle speed) calculation means 3L and 3R, and, when the vehicle speed exceeds, for example, 80 km/h, lowers the threshold level by such an amount to expedite the detection of hydroplaning in a speed range where it is prone to occur.

Because the occurrence of hydroplaning can be sufficiently detected even without the variable control of the threshold (VTH) 7a for determination, the run-state detection means 6 and the determination threshold setting means 7 may need not be provided.

With the arrangement described above, the hydroplaning detector apparatus 1 according to claims 1, 3, and 4 constantly monitors the level ratio between the main signal component 4La (4Ra) and the other signal component 4Lb (4Rb) in the wheel rotation speed signal 2La (2Ra). When the other signal component 4Lb (4Rb) is generated or its level rises as hydroplaning occurs, the determination means 5L (5R) generates the detection output 5La (5Rb). Then, the alarm means 8 notifies the driver of the occurrence of hydroplaning.

Although FIG. 1 shows the arrangement where the specific frequency component extraction means 4L and 4R are provided for the left and right wheels, respectively, the scale of the hardware configuration may be reduced to substantially half by combining the detection outputs 2La and 2Ra from the respective wheel rotation speed sensors 2L and 2R, and performing the calculation of the average rotation speed and extraction of the specific frequency component based on the combined signal.

Figure 5:
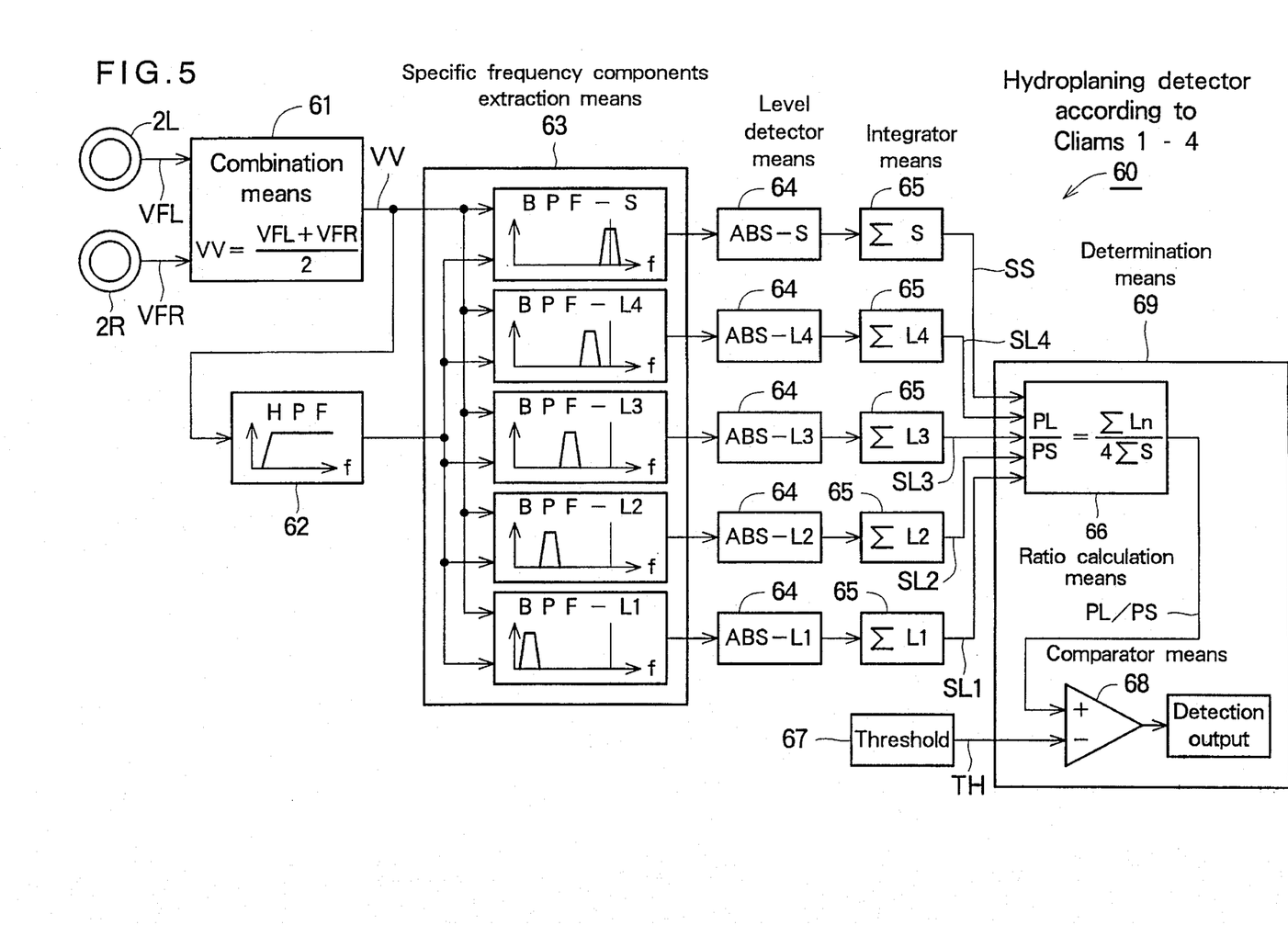
FIG. 5 is a block diagram showing the entire arrangement of the hydroplaning detector apparatus according to claims 1–4.

FIG. 5 is a block diagram showing the entire arrangement of the hydroplaning detector apparatus according to claims 1–4.

The hydroplaning detector apparatus 60 comprises a combination means 61 for combining output signals (wheel rotation speed signals) VFL and VFR from the wheel rotation speed sensor 2L and 2R installed on the left and right wheels, respectively, and outputting a combined signal VV for the average of the left and right wheel rotation speeds, a high-pass filter (HPF) 62, a specific frequency component extraction means 63, a level detector means (ABS) 64 for the level of signal components for each divided frequency band, an integrator means 65 for integrating each level detection value, a ratio calculation means 66 for finding the ratio of the level of main components to the level of other components, and a comparator means 68 for comparing the calculated ratio PL/PS with a threshold TH established by a threshold setting means 67, and generating a detection output indicating the occurrence of hydroplaning. The ratio calculation means 66 and the comparator means 68 constitute a determination means 69.

Each of the wheel rotation speed sensors 2L and 2R used is one outputting a pulse signal at each predetermined rotation angle of the wheel (not shown).

The combination means 61 is arranged to output a combined signal VV containing the frequency components of each wheel rotation speed by dividing the sum of respective wheel speed signals VFL and VFR into two.

The high-pass filter (HPF) 62 is to remove low frequency components contained in the combined signal VV. It has cutoff characteristics with a cutoff frequency of, for example, about 3 Hz, so that variation (low frequency components) in the wheel rotation speed (vehicle speed) due to the operation of the accelerator or brake by the driver is not supplied to the specific frequency component extraction means 63.

The specific frequency component extraction means 63 is constructed by combining a plurality of band-pass filters (five in the embodiment) (BPF-S, L4-L1). Each band-pass filter (BPF) used is an active filter the pass band of which can be varied based on the combined signal VV.

The band-pass filter (BPF-S) constituting the main component extraction means for extracting the signal components in the main frequency band (main components) corresponding to the wheel rotation speed (vehicle speed) is arranged to extract the signal components in the main frequency band centering the main frequency f0 based on the combined signal VV.

The other component extraction means is constituted by the band-pass filters (BPF-L4-L1) the pass band of each of which is a different divided frequency band of the frequency band lower than the main frequency f0. Although the embodiment shows an arrangement dividing the band lower than the main frequency f0 into four, the number of divisions may be appropriately changed.

Each level detection means (ABS-S, L4-L1) 64 is for obtaining the level (power) of the signal components extracted by each band-pass filter (BPF-S, L4-L1) for the divided band.

Each integrator means 65 outputs an integrated value which is the output value on the level (power) output from each level detection means 64 integrated for a predetermined period of time (for example, several hundred milliseconds to about two seconds).

The ratio calculation means 66 compares a value PS which is the integrated value SS of the signal components in the main frequency band multiplied by four, with a sum PL of the integrated values (SL4-SL21) of the signal components in the other frequency bands, and outputs the calculated value (ratio) PL/PS.

The comparator means 68 compares the value PL/PS which is the result of the ratio calculation by the ratio calculation means 66, with the threshold TH supplied from the threshold setting means 67, and outputs a detection output indicating the occurrence of hydroplaning when the ratio calculated output PL/PS exceeds the threshold TH.

Although the embodiment shows an arrangement for determination with a fixed threshold, the threshold TH may be variable for determination depending on the operating conditions such as the vehicle speed.

The functions of the specific frequency component extraction means 63 and each level detection means 64 may be provided by a spectrum analyzer having a fast Fourier transform (FFT) function.

With the arrangement described above, in the hydroplaning detector apparatus 60 according to claims 1–4, when the penetration of a water film causes the output signals VFL and VFR of the wheel rotation speed sensors 2L and 2R to contain signal components different from the frequencies corresponding to the present vehicle speed (wheel rotation speed), these signal components (other signal components) are extracted by the respective band-pass filters (BPF-L4-L1) for the lower frequencies, the ratio PL/PS to the main components varies according to the extracted level (power), and, when the ratio exceeds the threshold TH, a detection output indicating the occurrence of hydroplaning is obtained.

In addition to notify to the driver of an alarm generated by the detection output indicating the occurrence of hydroplaning, the determination may be made on the operating conditions such as traveling over a dry road if the ratio is 0.1 or less, traveling over a wet road if it is in a range of 0.1 to 0.9, and the occurrence of partial hydroplaning if it exceeds 0.9.

Thus, a system for evaluating wet-condition performance in the development of a vehicle or tire may be constructed by using the hydroplaning detector apparatus according to the present invention.

As described above, because the hydroplaning detector apparatus according to claim 1 is arranged to respectively extract the main frequency signal components corresponding to the wheel rotation speed and the vehicle speed and the signal components in other frequency bands near the main frequency from the wheel rotation speed signals output from the wheel rotation speed sensor with the specific frequency component extraction means, and to determine the occurrence of hydroplaning based on the respective extracted signal components, it can detect the occurrence of hydroplaning based simply on the frequency components in the wheel rotation speed signal.

Thus, the occurrence of hydroplaning including its initial stage of occurrence can be accurately detected regardless of the types of vehicle or tire, or various operating conditions.

Furthermore, because it is not necessary to store reference data, and to have a means for calculating the difference between the reference data and the wheel rotation speed signal in actual operating as in the conventional detector, the arrangement of the apparatus can be simplified.

Frequency components necessary for determining the occurrence of hydroplaning can be effectively extracted by an arrangement in which specific frequency components are separately extracted by a main component extraction means and a plurality of other component extraction means for different bands of frequencies lower than the frequencies for main components, and an adder means adds the outputs of the plurality of other component extraction means. Particularly, when frequency bands lower than the main frequency are divided into several bands, which are handled by a plurality of other component extraction means, frequency components necessary for the determination can be properly extracted even if the frequency bands are not continuous. In other words, when it is compared with the arrangement where a wide range of bands including frequency components unnecessary for the determination and evaluation is extracted by one other component extraction means, it reduces the inclusion of components such as noise so that more proper determination becomes possible.

Under a situation in which hydroplaning may occur, hydroplaning significantly affects the frequency band lower than the main frequency, and also affects the frequency band higher than the main frequency even at low level.

Therefore, with an arrangement in which the frequency band is divided into a plurality of bands, and outputs extracted from them are added, it becomes possible to perform detection and determination using signal components at frequencies higher than the main component as well.

In addition, with an arrangement which comprises a ratio calculation means for calculating the ratio between the level of signal components in the main frequency band and the level of signal components in the other frequency bands, and a comparator means for comparing the level ratio with a threshold, and determining the occurrence of hydroplaning, it becomes possible to perform stable determination regardless of the variation in characteristics such as sensitivity of the wheel rotation speed sensor or the variation in the absolute level of the wheel rotation signals due to aging, or the variation in the output level of the wheel rotation speed sensor under the influence of road surface conditions or tire characteristics. Because the determination is made based on the ratio, it is not necessary to change the threshold level in response to the output level of the wheel rotation speed sensor so that the setting of threshold level can also be simplified.

The hydroplaning detector apparatus according to claim 4 comprises a main component extraction means for extracting main frequency components corresponding to the speed of vehicle, and a low frequency component extraction means for extracting signal components in frequency bands lower than the main frequency so that other components can be easily extracted with a simple arrangement and the entire arrangement of the apparatus can be further simplified.

In addition, the determination is performed based on the level ratio between the main components and other components in lower frequencies so that, as described earlier, partial hydroplaning (initial stage of it) can be effectively detected.

We claim:

1. A hydroplaning detector apparatus detecting the occurrence of hydroplaning on a wheel based on wheel rotation speed signals output from a wheel rotation speed sensor, said sensor detecting the wheel rotation speed of a vehicle, comprising:

a specific frequency component extraction means for respectively extracting signal components of a main frequency or signal components in a main frequency band in a predetermined frequency band centering on the main frequency corresponding to said wheel rotation speed or said vehicle speed, and the signal components in other frequency bands near the main frequency from said wheel rotation speed signals, and a determination means for determining the occurrence of hydroplaning based on the signal components of said main frequency or the signal components in the main frequency band in the predetermined frequency band centering on the main frequency, and the signal components in said other frequency bands.

2. A hydroplaning detector apparatus according to claim 1, wherein said specific frequency component extraction means comprises a main component extraction means for extracting the signal components of said main frequency or the signal components in the main frequency band in the predetermined frequency band centering on the main frequency, a plurality of other component extraction means for dividing frequency bands lower than said main frequency into different frequency bands and extracting signal components from each of these frequency bands, and an adder means for adding the respective extracted components from said plurality of other component extraction means, and said determination means determines the occurrence of hydroplaning based on the extracted output of said main component extraction means and the added output from said adder means.

3. A hydroplaning detector apparatus according to claim 1, wherein the determination means comprises a ratio calculation means for calculating the ratio of the level of the signal components of said main frequency or the signal components in the main frequency band in the predetermined frequency band centering on the main frequency to the level of the signal components in said other frequency bands, and a comparator means for comparing the level ratio output from said calculation means with a predetermined threshold.

4. A hydroplaning detector apparatus detecting the occurrence of hydroplaning on a wheel based on wheel rotation speed signals output from a wheel rotation speed sensor, said sensor detecting the wheel rotation speed of a vehicle, comprising:

a main component extraction means for extracting signal components of a main frequency or signal components in a main frequency band in a predetermined frequency band centering the main frequency corresponding to said vehicle speed from said wheel rotation speed signals, a low frequency component extraction means for extracting signal components in a frequency band lower than said main frequency from said wheel rotation speed signals, and a hydroplaning occurrence detection means for detecting the occurrence of hydroplaning based on the ratio of the level of the main components extracted by said main component extraction means to the level of the low frequency components extracted by said low frequency component extraction means.

* * * * *